United States Patent [19]

Nakamura et al.

[11] Patent Number: 4,690,861

[45] Date of Patent: Sep. 1, 1987

[54] MAGNETO OPTICAL RECORDING MEDIUM

[75] Inventors: Hitoshi Nakamura; Yujiro Kaneko; Yasuo Sawada, all of Numazu; Hajime Machida, Tokyo; Fumiya Omi; Atsuyuki Watada, both of Numazu, all of Japan

[73] Assignee: Ricoh Co., Ltd., Tokyo, Japan

[21] Appl. No.: 832,373

[22] Filed: Feb. 24, 1986

[30] Foreign Application Priority Data

Mar. 11, 1985 [JP] Japan ................................. 60-46647

[51] Int. Cl.$^4$ ............................................. G11B 9/00
[52] U.S. Cl. ...................................... 428/623; 428/627; 428/632; 428/651; 428/666; 428/670; 428/672; 428/673; 428/686; 428/212; 428/336; 428/469; 428/471; 428/694; 428/697; 428/701; 428/702; 428/704; 428/900
[58] Field of Search ............... 428/692, 694, 900, 623, 428/627, 632, 651, 666, 670, 672, 673, 686, 212, 336, 469, 471, 697, 701, 702, 704; 360/131, 135; 365/122; 369/13, 288

[56] References Cited

U.S. PATENT DOCUMENTS

| 4,543,198 | 9/1985 | Kamiyama ..................... 252/62.59 |
| 4,544,602 | 10/1985 | Kobayashi et al. ................. 428/900 |
| 4,562,105 | 12/1985 | Machida et al. .................... 428/900 |

FOREIGN PATENT DOCUMENTS 3413086 11/1984 Fed. Rep. of Germany .
45644 3/1984 Japan .

Primary Examiner—George F. Lesmes
Assistant Examiner—William M. Atkinson
Attorney, Agent, or Firm—Oblon, Fisher, Spivak, McClelland, & Maier

[57] ABSTRACT

A magneto optical recording medium comprising laminating a reflective layer, a dielectric undercoat layer and a hexagonal magnetoplumbite-type metal oxide magnetic layer on a substrate in order, characterized by that said magnetic layer is made an excellently C axis - orientated perpendicular magnetic film by putting the crystal misfit between said reflective layer and said dielectric undercoat layer formed thereon within ±30% and the crystal misfit between said dielectric undercoat layer and said hexagonal magnetoplumbite -type metal oxide magnetic layer formed thereon within ±30%, and thus various characteristics are widely improved.

37 Claims, 1 Drawing Figure

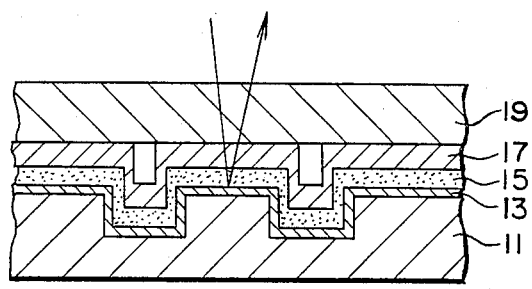

MAGNETO OPTICAL RECORDING MEDIUM

BACKGROUND OF THE INVENTION 1. (a) Field of the Invention

The present invention relates to a magneto optical recording medium having a perpendicular magnetic anisotropic thin film made of a hexagonal magnetoplumbite-type metal oxide magnetic substance.

2. (b) Description of the Prior Art

In recent years, magneto optical recording mediums designed to write a domain in a perpendicularly magnetized magnetic thin film utilizing the thermal effect of light and record information, and read said recorded information out utilizing the magneto-optic effect have been attracting public attention.

As the magnetic substances used in magneto optical recording mediums, there have usually been known those consisting of amorphous alloys made of rare earth metals and transition metals. The magneto-optical recording mediums using such amorphous alloy magnetic substances are generally prepared in the manner of adhering said magnetic substance, for instance Tb-Fe alloy, on a substrate such as a glass plate by vacuum vapordeposition, sputtering or the like in the degree of about 0.1-1 μm in thickness to form a magnetic substance. Record of information is put on this magneto-optical recording medium in the manner of making use of the rapid variation characteristic of a coercive force corresponding to the temperature variation in the neighborhood of the Curie temperature or compensation temperature of the magnetic substance, concretely in the manner of radiating the laser beam modulated with a divalent signal on the magnetic film and heating, thereby inverting the direction of magnetization. Regeneration is carried out by reading out making use of the difference in magneto-optical effects of the thus inversion-recorded magnetic film. The magneto-optical recording medium using the aforesaid amorphous alloy magnetic substance is advantageous in that it can be prepared easily by vacuum vapordeposition, sputtering or the like, and recording can be carried out at a high speed with a semi-conductor laser beam because the curie temperature is relatively low, namely 70°-200° C. and the recording sensitivity is high, but is very defective in that the amorphous alloy magnetic substance, in particular the rare earth metal component, is subject to oxidizing corrosion, and consequently the magnetooptic characteristic of the magnetic film deteriorates with a lapse of time. In order to prevent this, it is known to provide a protective layer consisting of an oxide such as SiO, SiO₂ or the like on an amorphous magnetic film. However, this is defective in that at the time of preparing the magnetic film or the protective layer by means of vacuum vapordeposition, sputtering or the like, the magnetic film is oxidized and corroded by O₂ remaining in the vacuum, O₂, H₂O or the like adsorbed onto the surface of the substrate, and O₂, H₂O or the like contained in the target consisting of the alloy magnetic substance with a lapse of time, and that this oxidizing corrosion is further enhanced by the light and heat at the time of recording. Further, the amorphous magnetic substance is disadvantageous in that it is liable to be crystallized by heat and therefore its magnetic characteristic is liable to be deteriorated.

In the usual magneto-optical recording mediums, still further, the recorded information has been read out by means of the magneto-optical effect caused by reflection from the surface of the magnetic film, namely the Kerr effect, because this magnetic film is low in the permeability in the laser wavelength region. However, this involves the problem that the regeneration sensitivity is low because the Kerr's angle of rotation is generally small.

On the other hand, the inventors of this application has developed a magneto optical recording medium using a perpendicular magnetic film comprising a hexagonal magnetoplumbite-type metal oxide magnetic layer (Japanese Laid Open Patent Application No. 45644/1984, Japanese Laid Open Patent Application No. 168950/1984).

It has usually be known that hexagonal magnetoplumbite-type metal oxide magnetic substances represented by the general formula (A) are usable as magnetic bubble materials.

$$MeO \cdot n(Fe_2O_3) \qquad (A)$$

(wherein, Me stands for one kind or 2 kinds or more of metals selected from the group consisting of Ba, SR and Pb, and $N: 5 \leq n \leq 6$)

The inventors of this application have perceived that the magnetic substance of this sort is a stable oxide and has no possibility of oxidizing deterioration, can display permeability in the laser wavelength region even when the film thickness is increased, and can utilize the Faraday effect efficiently. However, the above mentioned hexagonal magnetoplumbite-type metal oxide magnetic substance having the aforesaid general formula (A), even if planned to use said substance as it stands as the magnetic film for the magneto optical recording medium, involves the problems that the Curie temperature is too high, the value of coercive force is not suitable, the Faraday effect is small and the like, and is not reliable in the points of write-in ability, read-out ability, sensitivity and the like required for the memory. The inventors of this application have previously proposed to solve the above mentioned problems in the manner of replacing part of Fe atom having the said general formula (A) by divalent metals such as Co and Ni, trivalent metals such as In and Al, or further tetravalent metals such as Ti, Ge, W and Mo, thereby making it possible to use the hexagonal magnetoplumbite-type metal oxide magnetic substance as the magnetic film for the magneto optical recording medium.

In the case of using said hexagonal magnetoplumbite-type metal oxide magnetic film in the magneto-optical recording medium, it is necessary that said film should be the so-called perpendicular magnetic film wherein the C axis of the hexagonal crystal has been orientated on the surface of the substrate. The inventors of this application have previously found that in a magneto-optical recording medium comprising a substrate and a magnetic layer, there can be formed the magnetic layer having a perpendicular magnetic anisotropy by maintaining the misfit between a specific crystal surface of said substrate and the C surface of a hexagonal magnetoplumbite-type metal oxide magnetic substance within a predetermined range (Japanese Laid Open Patent Application No. 175229/1985), and have also proposed that the substrate of this application may be provided with an undercoat layer of ZnO, AlN or the like. In the thus obtained magneto-optical recording medium, however, the magnetooptical effect, increase in pit number, reproducibility and high density record regeneratability are influenced widely by the fine difference in the C axis orientation property of the hexagonal magnetoplumbite-type metal oxide magnetic layer, and consequently the crystalline orientation property of the substrate or undercoat layer on which this oxide magnetic layer is formed has an exceedingly great influence. It is difficult for this invention to maintain the crystalline orientation property of the substrate or undercoat layer always within a predetermined range. Accordingly, the above mentioned effects of the magneto-optical recording medium per se can not be achieved to the full, because the perpendicular magnetic anisotropy becomes unbalanced.

SUMMARY OF THE INVENTION

It is an object of the present invention to provide a magneto-optical recording medium which has improved a perpendicular magnetic anisotropy of a magnetic layer wherein said magnetic layer is made of a hexagonal magnetoplumbite-type metal oxide magnetic substance.

It is another object of the present invention to provide a magneto-optical recording medium superior in magnetooptical effect which takes the structure of substrate/reflective layer/dielectric undercoat layer/magnetic layer in order to obtain a great Faraday effect by utilizing the superior light permeability of a hexagonal magnetoplumbite-type metal oxide magnetic substance effectively, and is designed to increase the Faraday effect by utilizing multiple reflection resulting from radiation of light from the magnetic layer side.

It is a further object of the present invention to provide a magneto-optical recording medium which is capable of forming a magnetic layer with an accurately C surface-orientated perpendicular magnetic film by putting crystal surfaces of respective layers, namely those between a reflective layer and a dielectric undercoat layer and between a dielectric undercoat layer and a magnetic layer in a specified relation, said reflective layer, dielectric undercoat layer and magnetic layer being laminated on a substrate in order; increasing the pit number; improving reproducibility conspicuously; and regenerating a high density image.

According to the present invention, there is provided a magneto-optical recording medium costructed so that a reflective layer, a dielectric undercoat layer and a hexagonal magnetoplumbite-type metal oxide magnetic layer are laminated in order; the crystal misfit between said reflective layer and said dielectric undercoat layer formed thereon is within ±30%, preferably within ±15%, and the crystal misfit between said dielectric undercoat layer and said hexagonal magnetoplumbite-type metal oxide magnetic layer formed thereon is within ±30%, preferably within ±15%.

The other objects and constructions will be clear from the following explanations.

BRIEF DESCRIPTION OF THE DRAWING

The drawing is a partial sectional view showing one structural embodiment of the magneto-optical recording medium according to the present invention.

DETAILED DESCRIPTION OF THE INVENTION

The present invention will be explained in more detail hereinafter.

As shown in the drawing, the magneto-optical recording medium according to the present invention comprises forming a reflective layer 13, a dielectric undercoat layer 15 and a hexagonal magnetoplumbite-type metal oxide magnetic layer 17 on a pregrooved substrate 11 provided with unevenness for guide track in order, and further forming thereon a protective plate 19.

The crystal misfit between the reflective layer 13 and the dielectric undercoat layer 15 is within ±30%, preferably within ±15%. This relation constitutes part of the novel and very important features of the present invention. When this relation deviates from the above mentioned range, the perpendicular magnetic anisotropy of the magnetic layer 17 becomes unbalanced. Consequently, it becomes impossible to obtain a magneto-optical recording medium having a predetermined characteristic.

The misfit f is expressed as follows:

$$f=(a-b)/a \times 100(\%)$$

wherein, a denotes an atomic surface distance of the substrate and b denotes an atomic surface distance on the growing side.

The relation between the crystal orientation and the misfit will be given in Table 1 with reference to some reflective layers and dielectric undercoat layers.

TABLE 1

Crystal orientation relation and misfit between reflective layer and dielectric undercoat layer

| | | dielectric undercoat layer | | | | |
|---|---|---|---|---|---|---|
| | | ZnO (002) | AlN (002) | MgO (111) | BeO (002) | Soft magnetic spinel ferrite such as Ni—Zn ferrite or the like |
| Reflective layer | Au (111) | 12.7 | 8.0 | 3.3 | −6.5 | 3.0 |
| | Pt (111) | 17.1 | 12.3 | 7.4 | −2.7 | 7.0 |
| | Al (111) | 13.5 | 8.8 | 4.1 | −5.8 | 3.7 |
| | Ag (111) | 12.5 | 7.8 | 3.1 | −6.6 | 2.8 |
| | Rh (111) | 20.8 | 15.8 | 10.8 | 0.3 | 10.4 |
| | Pd (111) | 18.1 | 13.2 | 8.3 | −1.9 | 8.0 |

As shown above, orientation of the dielectric undercoat layer depends on its epitaxial growth with the crystal face of th reflective layer, for instance Au(111)//ZnO(002), Au(111)//AlN(002) or the like. When the Au(111) face is not orientated in the reflective layer (which is called nonorientation), ZnO(002) face and AlN(002) face do not grow, or even grow, the next C axis orientation of the magnetic layer gets worse extremely.

As the reflective layer, there are preferably used Au, Pt, Rh, Pd, Ag and Al. It is preferable that (111) crystal faces of these metals should be orientated in the direction parallel with the substrate. The orientation like this can be achieved by controlling the substrate temperature for instance in the range of 200°–300° C. for instance when forming a reflective layer on the substrate by means of the thin film forming method such as electron beam vapordeposition or the like. The film thickness of the reflective layer is properly in the range of about 0.01–5 μm, preferably in the range of 0.05–2 μm.

Further, the dielectric undercoat layer is required to have the misfit within ±30% with the C face of the hexagonal magnetoplumbite-type metal oxide magnetic layer formed thereon, preferably within ±15%. As the dielectric undercoat layer as aforesaid, there can be enumerated ZnO(002), AlN(002), MgO(111), BeO(002), soft magnetic spinel ferrites such, for instance, as Ni-Zn ferrite (111) and the like. The misfit between these crystal faces and the crystal C face of barium ferrite (the one represented by the general formula A, wherein Me=Ba) will be shown as follows.

TABLE 2

| Dielectric undercoat layer | Misfit (%) |
|---|---|
| ZnO(002) | −9.37 |
| AlN(002) | 1.29 |
| MgO(111) | −0.93 |
| Ni—Zn ferrite (111) | 0.35 |
| BeO(002) | 9.14 |

The dielectric undercoat layer can be formed on the reflective layer through epitaxial growth by means of for instance sputtering, CVD or vapordeposition. The film thickness of the dielectric undercoat layer is properly in the range of about 0.02-0.5 μm, preferably in the range of about 0.05-0.3 μm. Further, it is preferable to form an intermediate layer made of Ti or Cr between the reflective layer 13 and the substrate 11. Provision of said intermediate layer can reduce $\Delta\theta_{50} \cdot \Delta\theta_{50}$ (delta·theta·50: angle of dispersion of orientation) denotes a standard showing how the crystal face of the reflective layer is well orientated, namely degree of orientation. The smaller the value of $\Delta\theta_{50}$, the better the orientation. The film thickness of said intermediate layer is suitably in the range of about 0.001-0.5 μm, preferably in the range of about 0.02-0.3 μm.

Even when an intermediate layer is not provided, $\Delta\theta_{50}$ can be reduced by annealing a reflective layer at a temperature of 400°-600° C. immediately after said reflective layer has been formed by vapordeposition or the like. The essence of the present invention is to control the misfit between the reflective layer and the dielectric undercoat layer and between the dielectric undercoat layer and the hexagonal magnetoplumbite-type metal oxide magnetic layer. The structures and the materials used in the magneto-optical recording medium according to the present invention can be employed as the occasion may demands.

For instance, as the substrate 11 there can be used a substate other than the pregrooved substrate. And, the protective plate 19 is not necessarily needed. The hexagonal magnetoplumbite-type metal oxide magnetic substance is also not defined specifically and may be selected according to the required characteristic. For instance, the following may be enumerated.

$$MeO \cdot n[Ma_x Mb_y Mc_z Fe_{2-(x+\frac{2}{3}y+4/3z)}O_3] \quad (1)$$

(wherein, Me, Ma, Mb, Mc, x, y, z and n are defined as follows:
  Me: one kind or two kinds or more of divalent metals selected from the group consisting of Ba, Sr, Pb, La and Ca
  Ma: one kind or two kinds or more of trivalent metals selected from the group consisting of Ga, Al, Cr and Rh
  Mb: one kind or two kinds or more of divalent metals selected from the group consisting of Co and Ni
  Mc: one kind or two kinds or more of metals selected from the group consisting of Ti, Mn, Ir, Sn, V, Ta, Hf, Pd, Nb, Re, Pt, Os, Zr, Tc, Rh, Ge, Ru, W, Te, Pr, Ce and Pb
  x: $0 \leq x \leq 0.5$
  y: $0 < y \leq 0.5$
  z: $0 \leq z \leq 0.5$, wherein x and z are not zero at the same time. And, $0 < x+y+z \leq 1.0$
  n: $5 \leq n \leq 6$ Preparation of a magnetic film using the hexagonal magnetoplumbite-type metal oxide magnetic substance according to the present invention can be made, for instance, in the manner of adhering said substance on the substrate (400°-700° C.) so as to have a thickness of about 0.1-10 μm by means of vacuum vapordeposition, sputtering, ion plating or the like. The thus obtained magnetic film has been orientated perpendicularly. It is also possible to form a magnetic film when the substrate temperature is less than 500° C. In order to attain to perpendicular orientation in this instance, it is necessary to subject the thus formed magnetic film to heat treatment at 500°-800° C., while impressing a magnetic field as occasion demands. A heat resisting substrate is used in preparing such a magnetic film. As the substrate materials there are generally used metals such as aluminum, stainless steel, copper and nickel; quartz glass; GGG (gallium-gadolinium-garnet); sapphire, lithium tantalate; crystallized transparent glass; Pyrex glass, alumino-silicate glass and soda glass; surface oxidation-treated or -untreated single crystalline silicon; transparent ceramic materials such as $Al_2O_3$, $Al_2O_3 \cdot MgO$, $MgO \cdot LiF$, $Y_2O_3 \cdot LiF$, $BeO$, $ZrO_2 \cdot Y_2O_3$, $ThO_2 \cdot CaO$ and the like; inorganic silicone materials (such, for instance, as tosguard produced by Toshiba Silicone K.K. and sumicerum P produced by Sumitomo Kagaku K.K.) and organic materials such as polyimide resin, polyamide resin and the like.

The magneto-optical recording medium according to the present invention can be recorded and regenerated in a usual manner of radiating a modulated or polarized laser beam onto the magnetic film. For instance, information is recorded by the steps of radiating a laser beam selectively onto the perpendicularly magnetized magnetic film while impressing a magnetic field, heating said radiated portion more than the Curie temperature, decreasing the coercive force of said portion for magnetic inversion, and forming a recording bit. Said recorded information is read out in the manner of radiating a polarized laser beam onto the magnetic film and detecting it from the differences in the Faraday's angle of rotation.

According to the present invention, there can be obtained a magneto-optical recording medium having a superior magnetic uniformity and a good perpendicular magnetic anisotropy by controlling the orientation degrees of the crystal faces of the reflective layer, dielectric undercoat layer and magnetic layer.

Example will be given hereinafter.

EXAMPLE

A magneto-optical recording medium according to the present invention was prepared by forming an intermediate layer (there are instances where it is not formed), a reflective layer, a dielectric undercoat layer and a magnetic layer on a previously pregrooved glass substrate (100 mmφ) using the following ways.

(1) Formation of an intermediate layer

Cr or Ti was vapordeposited on a substrate (27°–100° C.) so as to have a thickness of 0.01–1.0 μm by electron beam vapordeposition.

(2) Formation of a reflective layer

Au, Pt, Pd, Rh, Ag or Al was electron beam vapordeposited on a substrate or an intermediate layer while controlling the substrate temperature, thereby forming a (111) face parallel to the substrate surface. The substrate temperature was 300° C. in the instance of Ag, and was 400° C. in the other instances. Said face was confirmed to be a (111) orientated film by X-ray diffraction.

The thickness of the reflective layers were made as follows depending on the dielectric undercoat layers formed thereon.

| Reflective layer film thickness | Dielectric undercoat layer |
|---|---|
| 0.5 μm | ZnO |
| 0.2 μm | AlN |
| 0.2 μm | MgO |
| 0.2 μm | Ni—Zn ferrite |
| 0.2 μm | Mn—Zn ferrite |

(3) Formation of a dielectric undercoat layer

The film of ZnO (thickness 0.1–0.5 μm), AlN (thickness 0.1–0.2 μm) or MgO (thickness 0.2–1.0 μm) was formed on a reflective layer by DC and RF magnetron sputtering method under the following conditions. In the instances of ZnO and AlN, a hexagonal C face, namely (002) face, was preferentially orientated on the (111) face of the metal of the reflective layer, while in the instance of MgO, a (111) face was orientated preferentially.

(i)

ZnO, MgO
Target: ZnO or MgO
Film thickness: 0.1 μm
Discharged electric power: 400 V, 0.35 A
Substrate temperature: 300° C.
Introduced gas pressure: $2.0 \times 10^{-2}$ Torr
Introduced gas: $O_2$: Ar=1:1

(ii)

AlN
Target: Al
Film thickness: 0.20 μm
Discharged electric power: 400 V, 0.50 A
Substrate temperature: 350° C.
Introduced gas pressure: $1.0 \times 10^{-3}$ Torr
Introduced gas: Ar: $N_2$=2:1

(iii)

Ni-Zn ferrite, Mn-Zn ferrite
Target: Ni-Zn, Mn-Zn ferrite
Film thickness: 0.2 μm
Discharged electric power: 120 W
Substrate temperature: 300° C.
Introduced gas pressure: $6.0 \times 10^{-3}$ Torr
Introduced gas: $O_2$: Ar=1:1

(4) Formation of a magnetic layer

Targets (300×100×5 mm) of the following compositions were prepared by sintering. Then, magnetic layers were formed by opposed target sputtering.

(i) Target compositions

| No. | Composition |
|---|---|
| T-1 | $BaO.6[Fe_{1.90}Co_{0.05}Ti_{0.05}O_3]$ |
| T-2 | $BaO.6[Fe_{1.50}Co_{0.25}Ti_{0.25}O_3]$ |
| T-3 | $BaO.6[Fe_{1.70}Co_{0.15}Ti_{0.15}O_3]$ |
| T-4 | $BaO.6[Fe_{1.90}Co_{0.05}Ti_{0.05}O_3]$ |
| T-5 | $BaO.6[Fe_{1.70}Co_{0.15}Ti_{0.15}O_3]$ |
| T-6 | $BaO.6[Fe_{1.65}Co_{0.1}Ti_{0.1}Ga_{0.15}O_3]$ |
| T-7 | $BaO.6[Fe_{1.70}Co_{0.05}Ti_{0.05}Al_{0.2}O_3]$ |
| T-8 | $SrO.6[Fe_{1.80}Co_{0.1}Ti_{0.1}O_3]$ |
| T-9 | $PbO.6[Fe_{1.60}Co_{0.2}Ti_{0.2}O_3]$ |
| T-10 | $Ba_{0.5}La_{0.5}O.6[Fe_{1.92}Co_{0.08}O_3]$ |
| T-11 | $Ba_{0.25}La_{0.25}O.6[Fe_{1.96}Co_{0.04}O_3]$ |
| T-12 | $LaO.6[Fe_{1.83}Co_{0.17}O_3]$ |

(ii)

Sputtering conditions
Film thickness: 0.2–0.3 μm
Discharged electric power: 400 V, 0.2 A
Substrate temperature: 550°–700° C.
Introduced gas pressure: $2 \times 10^{-3}$ Torr
Introduced gas: $O_2$: Ar=1:6–1:1

The thus prepared recording mediums were measured. The results were shown in Table 3.

These optical recording mediums were each magnetized unidirectionally. A laser beam (output: 20 mW) was radiated thereon while impressing a magnetic field of 500 Oe opposite to said magnetizing direction under the conditions (surface intensity: 10 mW, pulse frequency: 1 MHz), and inverted. This optical recording medium was recorded. Each optical recording medium formed a recording bit of 1.5 μm.

TABLE 3

| | Layered structure | | | | Characteristics | | | | | |
|---|---|---|---|---|---|---|---|---|---|---|
| | | | | | Orientation degree of reflective layer ($\Delta\theta_{50}$) | Orientation degree of undercoat layer ($\Delta\theta_{50}$) | Orientation degree of magnetic layer ($\Delta\theta_{50}$) | Magnetic characteristics | | Faraday's angle of rotation (degree) (λ = 780 nm) |
| Recording medium | Intermediate layer | Reflective layer | Undercoat layer | Magnetic layer | | | | Curie temperature (°C.) | coercive force (KOe) | |
| 1 | non | Au, Pt, Pd, Rh or Ag | ZnO | $BaO.6[Fe_{1.90}Co_{0.05}Ti_{0.05}O_3]$ | 2.1 | 1.6 | 2.0 | 400 | 1.7 | 0.9 |
| 2 | non | Au, Pt, Pd, Rh or Ag | ZnO | $BaO.6[Fe_{1.50}Co_{0.25}Ti_{0.25}O_3]$ | 2.2 | 1.8 | 2.1 | 250 | 1.0 | 2.0 |
| 3 | non | Au, Pt, Pd, Rh or Ag | ZnO | $BaO.6[Fe_{1.70}Co_{0.15}Ti_{0.15}O_3]$ | 2.1 | 1.7 | 2.1 | 320 | 1.2 | 1.8 |

TABLE 3-continued

| Recording medium | Intermediate layer | Reflective layer | Undercoat layer | Magnetic layer | Orientation degree of reflective layer ($\Delta\theta_{50}$) | Orientation degree of undercoat layer ($\Delta\theta_{50}$) | Orientation degree of magnetic layer ($\Delta\theta_{50}$) | Curie temperature (°C.) | coercive force (KOe) | Faraday's angle of rotation (degree) ($\lambda = 780$ nm) |
|---|---|---|---|---|---|---|---|---|---|---|
| 4 | non | Au, Pt, Pd, Rh or Ag | ZnO | $BaO.5[Fe_{1.90}Co_{0.05}Ti_{0.05}O_3]$ | 2.3 | 1.9 | 2.2 | 390 | 1.5 | 0.9 |
| 5 | non | Au, Pt, Pd, Rh or Ag | ZnO | $BaO.5[Fe_{1.70}Co_{0.15}Ti_{0.15}O_3]$ | 2.1 | 1.7 | 2.0 | 310 | 1.0 | 1.5 |
| 6 | non | Au, Pt, Pd, Rh or Ag | ZnO | $BaO.6[Fe_{1.70}Co_{0.05}Ti_{0.05}Al_{0.2}O_3]$ | 2.2 | 1.9 | 2.2 | 240 | 2.5 | 0.7 |
| 7 | non | Au, Pt, Pd, Rh or Ag | ZnO | $BaO.6[Fe_{1.65}Co_{0.1}Ti_{0.1}Ga_{0.15}O_3]$ | 2.0 | 1.6 | 2.0 | 210 | 2.0 | 1.2 |
| 8 | non | Au, Pt, Pd, Rh or Ag | ZnO | $SrO.6[Fe_{1.80}Co_{0.1}Ti_{0.1}O_3]$ | 2.1 | 1.7 | 2.0 | 380 | 1.5 | 1.2 |
| 9 | non | Au, Pt, Pd, Rh or Ag | ZnO | $PbO.5[Fe_{1.60}Co_{0.2}Ti_{0.2}O_3]$ | 2.1 | 1.6 | 2.0 | 310 | 0.8 | 1.8 |
| 10 | non | Al, Au, Pt, Pd Rh or Ag | ZnO | $Ba_{0.5}La_{0.5}O.6[Fe_{1.92}Co_{0.08}O_3]$ | 2.0 | 1.5 | 1.9 | 430 | 2.5 | 1.1 |
| 11 | non | Al, Au, Pt, Pd Rh or Ag | ZnO | $Ba_{0.25}La_{0.25}O.6[Fe_{1.96}Co_{0.04}O_3]$ | 2.0 | 1.4 | 1.8 | 450 | 2.1 | 0.8 |
| 12 | non | Al, Au, Pt, Pd Rh or Ag | ZnO | $LaO.6[Fe_{1.83}Co_{0.17}O_3]$ | 2.1 | 1.5 | 1.8 | 450 | 2.7 | 1.3 |
| 13 | Cr or Ti | Au, Pt, Pd, Rh or Ag | ZnO | $BaO.6[Fe_{1.90}Co_{0.05}Ti_{0.05}O_3]$ | 1.5 | 1.5 | 1.6 | 400 | 1.7 | 0.9 |
| 14 | Cr or Ti | Au, Pt, Pd, Rh or Ag | ZnO | $BaO.6[Fe_{1.50}Co_{0.25}Ti_{0.25}O_3]$ | 1.7 | 1.7 | 1.9 | 250 | 1.0 | 2.0 |
| 15 | Cr or Ti | Au, Pt, Pd, Rh or Ag | ZnO | $BaO.6[Fe_{1.70}Co_{0.15}Ti_{0.15}O_3]$ | 1.6 | 1.8 | 2.0 | 320 | 1.2 | 1.8 |
| 16 | Cr or Ti | Au, Pt, Pd, Rh or Ag | ZnO | $BaO.5[Fe_{1.90}Co_{0.05}Ti_{0.05}O_3]$ | 1.5 | 1.4 | 1.5 | 390 | 1.5 | 0.9 |
| 17 | Cr or Ti | Au, Pt, Pd, Rh or Ag | ZnO | $BaO.5[Fe_{1.70}Co_{0.15}Ti_{0.15}O_3]$ | 1.6 | 1.5 | 1.6 | 310 | 1.0 | 1.5 |
| 18 | Cr or Ti | Au, Pt, Pd, Rh or Ag | ZnO | $BaO.6[Fe_{1.70}Co_{0.05}Ti_{0.05}Al_{0.2}O_3]$ | 1.5 | 1.4 | 1.5 | 240 | 2.5 | 0.7 |
| 19 | Cr or Ti | Au, Pt, Pd, Rh or Ag | ZnO | $BaO.6[Fe_{1.65}Co_{0.1}Ti_{0.1}Ga_{0.15}O_3]$ | 1.9 | 1.8 | 1.6 | 210 | 2.0 | 1.2 |
| 20 | Cr or Ti | Au, Pt, Pd, Rh or Ag | ZnO | $SrO.6[Fe_{1.80}Co_{0.1}Ti_{0.1}O_3]$ | 1.9 | 1.7 | 1.8 | 380 | 1.5 | 1.2 |
| 21 | Cr or Ti | Au, Pt, Pd, Rh or Ag | ZnO | $PbO.5[Fe_{1.60}Co_{0.2}Ti_{0.2}O_3]$ | 1.9 | 1.8 | 1.9 | 310 | 0.8 | 1.8 |
| 22 | Cr or Ti | Al, Au, Pt, Pd, Rh or Ag | ZnO | $Ba_{0.5}La_{0.5}O.6[Fe_{1.92}Co_{0.08}O_3]$ | 1.6 | 1.5 | 1.6 | 430 | 2.5 | 1.1 |
| 23 | Cr or Ti | Al, Au, Pt, Pd, Rh or Ag | ZnO | $Ba_{0.25}La_{0.25}O.6[Fe_{1.96}Co_{0.04}O_3]$ | 1.5 | 1.4 | 1.5 | 450 | 2.1 | 0.8 |
| 24 | Cr or Ti | Al, Au, Pt, Pd, Rh or Ag | ZnO | $LaO.6[Fe_{1.83}Co_{0.17}O_3]$ | 1.6 | 1.4 | 1.5 | 450 | 2.7 | 1.3 |
| 25 | non | Al, Pt, Pd, Rh or Ag | AlN | $BaO.6[Fe_{1.90}Co_{0.05}Ti_{0.05}O_3]$ | 2.1 | 1.7 | 2.0 | 400 | 1.7 | 0.9 |
| 26 | non | Al, Pt, | AlN | $BaO.6[Fe_{1.50}Co_{0.25}Ti_{0.25}O_3]$ | 2.1 | 1.6 | 1.9 | 250 | 1.0 | 2.0 |

TABLE 3-continued

| Recording medium | Layered structure | | | | Characteristics | | | | | |
|---|---|---|---|---|---|---|---|---|---|---|
| | | | | | Orientation degree of reflective layer ($\Delta\theta_{50}$) | Orientation degree of undercoat layer ($\Delta\theta_{50}$) | Orientation degree of magnetic layer ($\Delta\theta_{50}$) | Magnetic characteristics | | Faraday's angle of rotation (degree) ($\lambda$ = 780 nm) |
| | Intermediate layer | Reflective layer | Undercoat layer | Magnetic layer | | | | Curie temperature (°C.) | coercive force (KOe) | |
| 27 | non | Al, Pt, Pd, Rh or Ag | AlN | $BaO \cdot 6[Fe_{1.70}Co_{0.15}Ti_{0.15}O_3]$ | 2.0 | 1.8 | 2.1 | 320 | 1.2 | 1.8 |
| 28 | non | Al, Pt, Pd, Rh or Ag | AlN | $BaO \cdot 5[Fe_{1.90}Co_{0.05}Ti_{0.05}O_3]$ | 2.1 | 1.8 | 2.1 | 390 | 1.5 | 0.9 |
| 29 | non | Al, Pt, Pd, Rh or Ag | AlN | $BaO \cdot 5[Fe_{1.70}Co_{0.15}Ti_{0.15}O_3]$ | 2.0 | 1.7 | 1.9 | 310 | 1.0 | 1.5 |
| 30 | non | Al, Pt, Pd, Rh or Ag | AlN | $BaO \cdot 6[Fe_{1.70}Co_{0.05}Ti_{0.05}Al_{0.2}O_3]$ | 2.1 | 1.8 | 2.1 | 240 | 2.5 | 0.7 |
| 31 | non | Al, Pt, Pd, Rh or Ag | AlN | $BaO \cdot 6[Fe_{1.65}Co_{0.1}Ti_{0.1}Ga_{0.15}O_3]$ | 2.0 | 1.7 | 1.9 | 210 | 2.0 | 1.2 |
| 32 | non | Al, Pt, Pd, Rh or Ag | AlN | $SrO \cdot 6[Fe_{1.80}Co_{0.1}Ti_{0.1}O_3]$ | 2.0 | 1.7 | 1.9 | 380 | 1.5 | 1.2 |
| 33 | non | Al, Pt, Pd, Rh or Ag | AlN | $PbO \cdot 5[Fe_{1.60}Co_{0.2}Ti_{0.2}O_3]$ | 2.0 | 1.8 | 2.0 | 310 | 0.8 | 1.8 |
| 34 | non | Al, Au, Pt, Pd, Rh or Ag | AlN | $Ba_{0.5}La_{0.5}O \cdot 6[Fe_{1.92}Co_{0.08}O_3]$ | 1.7 | 1.4 | 1.8 | 430 | 2.5 | 1.1 |
| 35 | non | Al, Au, Pt, Pd, Rh or Ag | AlN | $Ba_{0.25}La_{0.25}O \cdot 6[Fe_{1.96}Co_{0.04}O_3]$ | 1.6 | 1.3 | 1.7 | 450 | 2.1 | 0.8 |
| 36 | non | Al, Au, Pt, Pd, Rh or Ag | AlN | $LaO \cdot 6[Fe_{1.83}Co_{0.17}O_3]$ | 1.7 | 1.4 | 1.8 | 450 | 2.7 | 1.3 |
| 37 | Cr or Ti | Al, Pt, Pd, Rh or Ag | AlN | $BaO \cdot 6[Fe_{1.90}Co_{0.05}Ti_{0.05}O_3]$ | 2.0 | 1.8 | 2.2 | 400 | 1.7 | 0.9 |
| 38 | Cr or Ti | Al, Pt, Pd, Rh or Ag | AlN | $BaO \cdot 6[Fe_{1.50}Co_{0.25}Ti_{0.25}O_3]$ | 2.1 | 1.7 | 2.1 | 250 | 1.0 | 2.0 |
| 39 | Cr or Ti | Al, Pt, Pd, Rh or Ag | AlN | $BaO \cdot 6[Fe_{1.70}Co_{0.15}Ti_{0.15}O_3]$ | 2.1 | 1.7 | 2.2 | 320 | 1.2 | 1.8 |
| 40 | Cr or Ti | Al, Pt, Pd, Rh or Ag | AlN | $BaO \cdot 5[Fe_{1.90}Co_{0.05}Ti_{0.05}O_3]$ | 2.0 | 1.7 | 2.1 | 390 | 1.5 | 0.9 |
| 41 | Cr or Ti | Al, Pt, Pd, Rh or Ag | AlN | $BaO \cdot 5[Fe_{1.70}Co_{0.15}Ti_{0.15}O_3]$ | 2.0 | 1.7 | 2.2 | 310 | 1.0 | 1.5 |
| 42 | Cr or Ti | Al, Pt, Pd, Rh or Ag | AlN | $BaO \cdot 6[Fe_{1.70}Co_{0.05}Ti_{0.05}Al_{0.2}O_3]$ | 1.9 | 1.6 | 2.0 | 240 | 2.5 | 0.7 |
| 43 | Cr or Ti | Al, Pt, Pd, Rh or Ag | AlN | $BaO \cdot 6[Fe_{1.65}Co_{0.1}Ti_{0.1}Ga_{0.15}O_3]$ | 2.2 | 1.9 | 2.3 | 210 | 2.0 | 1.2 |
| 44 | Cr or Ti | Al, Pt, Pd, Rh or Ag | AlN | $SrO \cdot 6[Fe_{1.80}Co_{0.1}Ti_{0.1}O_3]$ | 2.1 | 1.7 | 2.1 | 380 | 1.5 | 1.2 |
| 45 | Cr or Ti | Al, Pt, Pd, Rh or Ag | AlN | $PbO \cdot 5[Fe_{1.60}Co_{0.2}Ti_{0.2}O_3]$ | 2.2 | 1.8 | 2.2 | 310 | 0.8 | 1.8 |
| 46 | Cr or Ti | Al, Au, Pt, Pd, Rh or Ag | AlN | $Ba_{0.5}La_{0.5}O \cdot 6[Fe_{1.92}Co_{0.08}O_3]$ | 1.7 | 1.5 | 1.9 | 430 | 2.5 | 1.1 |
| 47 | Cr or Ti | Al, Au, Pt, Pd, Rh or Ag | AlN | $Ba_{0.25}La_{0.25}O \cdot 6[Fe_{1.96}Co_{0.04}O_3]$ | 1.7 | 1.5 | 1.8 | 450 | 2.1 | 0.8 |
| 48 | Cr or Ti | Al, Au, Pt, Pd, Rh or Ag | AlN | $LaO \cdot 6[Fe_{1.83}Co_{0.17}O_3]$ | 1.6 | 1.4 | 1.7 | 450 | 2.7 | 1.3 |

TABLE 3-continued

| Recording medium | Layered structure | | | | Characteristics | | | | | |
|---|---|---|---|---|---|---|---|---|---|---|
| | | | | | Orientation degree of reflective layer ($\Delta\theta_{50}$) | Orientation degree of undercoat layer ($\Delta\theta_{50}$) | Orientation degree of magnetic layer ($\Delta\theta_{50}$) | Magnetic characteristics | | Faraday's angle of rotation (degree) ($\lambda$ = 780 nm) |
| | Intermediate layer | Reflective layer | Undercoat layer | Magnetic layer | | | | Curie temperature (°C.) | coercive force (KOe) | |
| 49 | non | Ag Al, Au, Pd, Rh or Ag | MgO | $BaO.6[Fe_{1.90}Co_{0.05}Ti_{0.05}O_3]$ | 2.0 | 1.5 | 2.0 | 400 | 1.7 | 0.9 |
| 50 | non | Al, Au, Pd, Rh or Ag | MgO | $BaO.6[Fe_{1.50}Co_{0.25}Ti_{0.25}O_3]$ | 2.0 | 1.7 | 2.1 | 250 | 1.0 | 2.0 |
| 51 | non | Al, Au, Pd, Rh or Ag | MgO | $BaO.6[Fe_{1.70}Co_{0.15}Ti_{0.15}O_3]$ | 2.1 | 1.6 | 2.1 | 320 | 1.2 | 1.8 |
| 52 | non | Al, Au, Pd, Rh or Ag | MgO | $BaO.5[Fe_{1.90}Co_{0.05}Ti_{0.05}O_3]$ | 2.0 | 1.9 | 2.0 | 390 | 1.5 | 0.9 |
| 53 | non | Al, Au, Pd, Rh or Ag | MgO | $BaO.5[Fe_{1.70}Co_{0.15}Ti_{0.15}O_3]$ | 2.1 | 1.6 | 2.1 | 310 | 1.0 | 1.5 |
| 54 | non | Al, Au, Pd, Rh or Ag | MgO | $BaO.6[Fe_{1.70}Co_{0.05}Ti_{0.05}Al_{0.2}O_3]$ | 2.1 | 1.8 | 2.1 | 240 | 2.5 | 0.7 |
| 55 | non | Al, Au, Pd, Rh or Ag | MgO | $BaO.6[Fe_{1.65}Co_{0.1}Ti_{0.1}Ga_{0.15}O_3]$ | 2.0 | 1.5 | 2.1 | 210 | 2.0 | 1.2 |
| 56 | non | Al, Au, Pd, Rh or Ag | MgO | $SrO.6[Fe_{1.80}Co_{0.1}Ti_{0.1}O_3]$ | 2.1 | 1.6 | 2.0 | 380 | 1.5 | 1.2 |
| 57 | non | Al, Au, Pd, Rh or Ag | MgO | $PbO.5[Fe_{1.60}Co_{0.2}Ti_{0.2}O_3]$ | 2.1 | 1.8 | 2.2 | 310 | 0.8 | 1.8 |
| 58 | non | Al, Au, Pt, Pd, Rh or Ag | MgO | $Ba_{0.5}La_{0.5}O.6[Fe_{1.92}Co_{0.08}O_3]$ | 1.6 | 1.6 | 1.7 | 430 | 2.5 | 1.1 |
| 59 | non | Al, Au, Pt, Pd, Rh or Ag | MgO | $Ba_{0.25}La_{0.25}O.6[Fe_{1.96}Co_{0.04}O_3]$ | 1.6 | 1.6 | 1.7 | 450 | 2.1 | 0.8 |
| 60 | non | Al, Au, Pt, Pd, Rh or Ag | MgO | $LaO.6[Fe_{1.83}Co_{0.17}O_3]$ | 1.5 | 1.5 | 1.8 | 450 | 2.7 | 1.3 |
| 61 | Cr or Ti | Al, Au, Pd, Rh or Ag | MgO | $BaO.6[Fe_{1.90}Co_{0.05}Ti_{0.05}O_3]$ | 1.7 | 1.4 | 1.6 | 400 | 1.7 | 0.9 |
| 62 | Cr or Ti | Al, Au, Pd, Rh or Ag | MgO | $BaO.6[Fe_{1.50}Co_{0.25}Ti_{0.25}O_3]$ | 1.5 | 1.4 | 1.9 | 250 | 1.0 | 2.0 |
| 63 | Cr or Ti | Al, Au, Pd, Rh or Ag | MgO | $BaO.6[Fe_{1.70}Co_{0.15}Ti_{0.15}O_3]$ | 1.6 | 1.3 | 1.6 | 320 | 1.2 | 1.8 |
| 64 | Cr or Ti | Al, Au, Pd, Rh or Ag | MgO | $BaO.5[Fe_{1.90}Co_{0.05}Ti_{0.05}O_3]$ | 1.9 | 1.4 | 1.7 | 390 | 1.5 | 0.9 |
| 65 | Cr or Ti | Al, Au, Pd, Rh or Ag | MgO | $BaO.5[Fe_{1.70}Co_{0.15}Ti_{0.15}O_3]$ | 1.5 | 1.3 | 1.6 | 310 | 1.0 | 1.5 |
| 66 | Cr or Ti | Al, Au, Pd, Rh or Ag | MgO | $BaO.6[Fe_{1.70}Co_{0.05}Ti_{0.05}Al_{0.2}O_3]$ | 1.5 | 1.3 | 1.6 | 240 | 2.5 | 0.7 |
| 67 | Cr or Ti | Al, Au, Pd, Rh or Ag | MgO | $BaO.6[Fe_{1.65}Co_{0.1}Ti_{0.1}Ga_{0.15}O_3]$ | 1.7 | 1.3 | 1.5 | 210 | 2.0 | 1.2 |
| 68 | Cr or Ti | Al, Au, Pd, Rh or Ag | MgO | $SrO.6[Fe_{1.80}Co_{0.1}Ti_{0.1}O_3]$ | 1.7 | 1.4 | 1.9 | 380 | 1.5 | 1.2 |
| 69 | Cr or Ti | Al, Au, Pd, Rh or Ag | MgO | $PbO.5[Fe_{1.60}Co_{0.2}Ti_{0.2}O_3]$ | 1.5 | 1.3 | 1.7 | 310 | 0.8 | 1.8 |
| 70 | Cr or Ti | Al, Au, Pt, Pd, Rh or Ag | MgO | $Ba_{0.5}La_{0.5}O.6[Fe_{1.92}Co_{0.08}O_3]$ | 1.6 | 1.3 | 1.7 | 430 | 2.5 | 1.1 |
| 71 | Cr or Ti | Al, Au, Pt, Pd, | MgO | $Ba_{0.25}La_{0.25}O.6[Fe_{1.96}Co_{0.04}O_3]$ | 1.6 | 1.3 | 1.7 | 450 | 2.1 | 0.8 |

TABLE 3-continued

| Recording medium | Intering mediate layer | Reflective layer | Undercoat layer | Magnetic layer | Orientation degree of reflective layer ($\Delta\theta_{50}$) | Orientation degree of undercoat layer ($\Delta\theta_{50}$) | Orientation degree of magnetic layer ($\Delta\theta_{50}$) | Curie temperature (°C.) | coercive force (KOe) | Faraday's angle of rotation (degree) ($\lambda$ = 780 nm) |
|---|---|---|---|---|---|---|---|---|---|---|
| 72 | Cr or Ti | Al, Au, Pt, Pd, Rh or Ag | MgO | $LaO.6[Fe_{1.83}Co_{0.17}O_3]$ | 1.5 | 1.4 | 1.8 | 450 | 2.7 | 1.3 |
| 73 | non | Al, Au, Pt, Pd, Rh or Ag | Ni—Zn Ferrite | $BaO.6[Fe_{1.90}Co_{0.50}Ti_{0.05}O_3]$ | 2.0 | 1.6 | 2.0 | 400 | 1.7 | 0.9 |
| 74 | non | Al, Au, Pt, Pd, Rh or Ag | Ni—Zn Ferrite | $BaO.6[Fe_{1.50}Co_{0.25}Ti_{0.25}O_3]$ | 2.1 | 1.6 | 2.1 | 250 | 1.0 | 2.0 |
| 75 | non | Al, Au, Pt, Pd, Rh or Ag | Ni—Zn Ferrite | $BaO.6[Fe_{1.70}Co_{0.15}Ti_{0.15}O_3]$ | 2.0 | 1.5 | 2.0 | 320 | 1.2 | 1.8 |
| 76 | non | Al, Au, Pt, Pd, Rh or Ag | Ni—Zn Ferrite | $BaO.5[Fe_{1.90}Co_{0.05}Ti_{0.05}O_3]$ | 2.1 | 1.7 | 2.2 | 390 | 1.5 | 0.9 |
| 77 | non | Al, Au, Pt, Pd, Rh or Ag | Ni—Zn Ferrite | $BaO.5[Fe_{1.70}Co_{0.15}Ti_{0.15}O_3]$ | 2.0 | 1.6 | 2.0 | 310 | 1.0 | 1.5 |
| 78 | non | Al, Au, Pt, Pd, Rh or Ag | Ni—Zn Ferrite | $BaO.6[Fe_{1.70}Co_{0.05}Ti_{0.05}Al_{0.2}O_3]$ | 2.0 | 1.5 | 2.0 | 240 | 2.5 | 0.7 |
| 79 | non | Al, Au, Pt, Pd, Rh or Ag | Ni—Zn Ferrite | $BaO.6[Fe_{1.65}Co_{0.1}Ti_{0.1}Ga_{0.15}O_3]$ | 2.1 | 1.6 | 2.1 | 210 | 2.0 | 1.2 |
| 80 | non | Al, Au, Pt, Pd, Rh or Ag | Ni—Zn Ferrite | $SrO.6[Fe_{1.80}Co_{0.1}Ti_{0.1}O_3]$ | 2.1 | 1.6 | 2.1 | 380 | 1.5 | 1.2 |
| 81 | non | Al, Au, Pt, Pd, Rh or Ag | Ni—Zn Ferrite | $PbO.5[Fe_{1.60}Co_{0.2}Ti_{0.2}O_3]$ | 2.1 | 1.6 | 2.1 | 310 | 0.8 | 1.8 |
| 82 | non | Al, Au, Pt, Pd, Rh or Ag | Ni—Zn Ferrite | $Ba_{0.5}La_{0.5}O.6[Fe_{1.92}Co_{0.08}O_3]$ | 1.6 | 1.3 | 1.7 | 430 | 2.5 | 1.1 |
| 83 | non | Al, Au, Pt, Pd, Rh or Ag | Ni—Zn Ferrite | $Ba_{0.25}La_{0.25}O.6[Fe_{1.96}Co_{0.04}O_3]$ | 1.6 | 1.3 | 1.7 | 450 | 2.1 | 0.8 |
| 84 | non | Al, Au, Pt, Pd, Rh or Ag | Ni—Zn Ferrite | $LaO.6[Fe_{1.83}Co_{0.17}O_3]$ | 1.5 | 1.4 | 1.8 | 450 | 2.7 | 1.3 |
| 85 | Cr or Ti | Al, Au, Pt, Pd, Rh or Ag | Ni—Zn Ferrite | $BaO.6[Fe_{1.90}Co_{0.05}Ti_{0.05}O_3]$ | 1.6 | 1.3 | 1.7 | 400 | 1.7 | 0.9 |
| 86 | Cr or Ti | Al, Au, Pt, Pd, Rh or Ag | Ni—Zn Ferrite | $BaO.6[Fe_{1.50}Co_{0.25}Ti_{0.25}O_3]$ | 1.6 | 1.4 | 1.7 | 250 | 1.0 | 2.0 |
| 87 | Cr or Ti | Al, Au, Pt, Pd, Rh or Ag | Ni—Zn Ferrite | $BaO.6[Fe_{1.70}Co_{0.15}Ti_{0.15}O_3]$ | 1.8 | 1.4 | 1.9 | 320 | 1.2 | 1.8 |
| 88 | Cr or Ti | Al, Au, Pt, Pd, Rh or Ag | Ni—Zn Ferrite | $BaO.5[Fe_{1.90}Co_{0.05}Ti_{0.05}O_3]$ | 1.7 | 1.3 | 1.6 | 390 | 1.5 | 0.9 |
| 89 | Cr or Ti | Al, Au, Pt, Pd, Rh or Ag | Ni—Zn Ferrite | $BaO.5[Fe_{1.70}Co_{0.15}Ti_{0.15}O_3]$ | 1.6 | 1.3 | 1.7 | 310 | 1.0 | 1.5 |

TABLE 3-continued

| Recording medium | Layered structure | | | | Characteristics | | | | | |
|---|---|---|---|---|---|---|---|---|---|---|
| | Intermediate layer | Reflective layer | Undercoat layer | Magnetic layer | Orientation degree of reflective layer ($\Delta\theta_{50}$) | Orientation degree of undercoat layer ($\Delta\theta_{50}$) | Orientation degree of magnetic layer ($\Delta\theta_{50}$) | Magnetic characteristics | | Faraday's angle of rotation (degree) ($\lambda$ = 780 nm) |
| | | | | | | | | Curie temperature (°C.) | coercive force (KOe) | |
| 90 | Cr or Ti | Ag Al, Au, Pt, Pd, Rh or Ag | Ni—Zn Ferrite | $BaO.6[Fe_{1.70}Co_{0.05}Ti_{0.05}Al_{0.2}O_3]$ | 1.7 | 1.4 | 1.8 | 240 | 2.5 | 0.7 |
| 91 | Cr or Ti | Al, Au, Pt, Pd, Rh or Ag | Ni—Zn Ferrite | $BaO.6[Fe_{1.65}Co_{0.1}Ti_{0.1}Ga_{0.15}O_3]$ | 1.6 | 1.4 | 1.7 | 210 | 2.0 | 1.2 |
| 92 | Cr or Ti | Al, Au, Pt, Pd, Rh or Ag | Ni—Zn Ferrite | $SrO.6[Fe_{1.80}Co_{0.1}Ti_{0.1}O_3]$ | 1.6 | 1.3 | 1.5 | 380 | 1.5 | 1.2 |
| 93 | Cr or Ti | Al, Au, Pt, Pd, Rh or Ag | Ni—Zn Ferrite | $PbO.5[Fe_{1.60}Co_{0.2}Ti_{0.2}O_3]$ | 1.5 | 1.3 | 1.6 | 310 | 0.8 | 1.8 |
| 94 | Cr or Ti | Al, Au, Pt, Pd, Rh or Ag | Ni—Zn Ferrite | $Ba_{0.5}La_{0.5}O.6[Fe_{1.92}Co_{0.08}O_3]$ | 1.6 | 1.3 | 1.7 | 430 | 2.5 | 1.1 |
| 95 | Cr or Ti | Al, Au, Pt, Pd, Rh or Ag | Ni—Zn Ferrite | $Ba_{0.25}La_{0.25}O.6[Fe_{1.96}Co_{0.04}O_3]$ | 1.6 | 1.3 | 1.7 | 450 | 2.1 | 0.8 |
| 96 | Cr or Ti | Al, Au, Pt, Pd, Rh or Ag | Ni—Zn Ferrite | $LaO.6[Fe_{1.83}Co_{0.17}O_3]$ | 1.5 | 1.4 | 1.8 | 450 | 2.7 | 1.3 |
| 97 | non | Al, Au, Pt, Pd, Rh or Ag | BeO | $BaO.6[Fe_{1.90}Co_{0.05}Ti_{0.05}O_3]$ | 2.1 | 1.5 | 2.1 | 400 | 1.7 | 0.9 |
| 98 | non | Al, Au, Pt, Pd, Rh or Ag | BeO | $BaO.6[Fe_{1.50}Co_{0.25}Ti_{0.25}O_3]$ | 2.0 | 1.6 | 2.1 | 250 | 1.0 | 2.0 |
| 99 | non | Al, Au, Pt, Pd, Rh or Ag | BeO | $BaO.6[Fe_{1.70}Co_{0.15}Ti_{0.15}O_3]$ | 2.0 | 1.5 | 2.0 | 320 | 1.2 | 1.8 |
| 100 | non | Al, Au, Pt, Pd, Rh or Ag | BeO | $BaO.5[Fe_{1.90}Co_{0.05}Ti_{0.05}O_3]$ | 2.0 | 1.6 | 2.1 | 390 | 1.5 | 0.9 |
| 101 | non | Al, Au, Pt, Pd, Rh or Ag | BeO | $BaO.5[Fe_{1.70}Co_{0.15}Ti_{0.15}O_3]$ | 2.0 | 1.7 | 2.1 | 310 | 1.0 | 1.5 |
| 102 | non | Al, Au, Pt, Pd, Rh or Ag | BeO | $BaO.6[Fe_{1.70}Co_{0.05}Ti_{0.05}Al_{0.2}O_3]$ | 2.0 | 1.6 | 2.1 | 240 | 2.5 | 0.7 |
| 103 | non | Al, Au, Pt, Pd, Rh or Ag | BeO | $BaO.6[Fe_{1.65}Co_{0.1}Ti_{0.1}Ga_{0.15}O_3]$ | 2.0 | 1.5 | 2.0 | 210 | 2.0 | 1.2 |
| 104 | non | Al, Au, Pt, Pd, Rh or Ag | BeO | $SrO.6[Fe_{1.80}Co_{0.1}Ti_{0.1}O_3]$ | 2.0 | 1.5 | 2.0 | 380 | 1.5 | 1.2 |
| 105 | non | Al, Au, Pt, Pd, Rh or Ag | BeO | $PbO.5[Fe_{1.60}Co_{0.2}Ti_{0.2}O_3]$ | 2.1 | 1.0 | 2.1 | 310 | 0.8 | 1.8 |
| 106 | non | Al, Au, Pt, Pd, Rh or Ag | BeO | $Ba_{0.5}La_{0.5}O.6[Fe_{1.92}Co_{0.08}O_3]$ | 1.6 | 1.3 | 1.7 | 430 | 2.5 | 1.1 |
| 107 | non | Al, Au, Pt, Pd, Rh or Ag | BeO | $Ba_{0.25}La_{0.25}O.6[Fe_{1.96}Co_{0.04}O_3]$ | 1.6 | 1.3 | 1.7 | 450 | 2.1 | 0.8 |

TABLE 3-continued

| Recording medium | Layered structure | | | | Characteristics | | | | |
|---|---|---|---|---|---|---|---|---|---|
| | Intermediate layer | Reflective layer | Undercoat layer | Magnetic layer | Orientation degree of reflective layer ($\Delta\theta_{50}$) | Orientation degree of undercoat layer ($\Delta\theta_{50}$) | Orientation degree of magnetic layer ($\Delta\theta_{50}$) | Magnetic characteristics | Faraday's angle of rotation (degree) ($\lambda = 780$ nm) |
| | | | | | | | | Curie temperature (°C.) / coercive force (KOe) | |
| 108 | non | Al, Au, Pt, Pd, Rh or Ag | BeO | LaO.6[Fe$_{1.83}$Co$_{0.17}$O$_3$] | 1.5 | 1.4 | 1.8 | 450 / 2.7 | 1.3 |
| 109 | Cr or Ti | Al, Au, Pt, Pd, Rh or Ag | BeO | BaO.6[Fe$_{1.90}$Co$_{0.05}$Ti$_{0.05}$O$_3$] | 1.7 | 1.4 | 1.7 | 400 / 1.7 | 0.9 |
| 110 | Cr or Ti | Al, Au, Pt, Pd, Rh or Ag | BeO | BaO.6[Fe$_{1.50}$Co$_{0.25}$Ti$_{0.25}$O$_3$] | 1.6 | 1.3 | 1.6 | 250 / 1.0 | 2.0 |
| 111 | Cr or Ti | Al, Au, Pt, Pd, Rh or Ag | BeO | BaO.6[Fe$_{1.70}$Co$_{0.15}$Ti$_{0.15}$O$_3$] | 1.5 | 1.3 | 1.6 | 320 / 1.2 | 1.8 |
| 112 | Cr or Ti | Al, Au, Pt, Pd, Rh or Ag | BeO | BaO.5[Fe$_{1.90}$Co$_{0.05}$Ti$_{0.05}$O$_3$] | 1.7 | 1.3 | 1.6 | 390 / 1.5 | 0.9 |
| 113 | Cr or Ti | Al, Au, Pt, Pd, Rh or Ag | BeO | BaO.5[Fe$_{1.70}$Co$_{0.15}$Ti$_{0.15}$O$_3$] | 1.5 | 1.3 | 1.6 | 310 / 1.0 | 1.5 |
| 114 | Cr or Ti | Al, Au, Pt, Pd, Rh or Ag | BeO | BaO.6[Fe$_{1.70}$Co$_{0.05}$Ti$_{0.05}$Al$_{0.2}$O$_3$] | 1.5 | 1.4 | 1.6 | 240 / 2.5 | 0.7 |
| 115 | Cr or Ti | Al, Au, Pt, Pd, Rh or Ag | BeO | BaO.6[Fe$_{1.65}$Co$_{0.1}$Ti$_{0.1}$Ga$_{0.15}$O$_3$] | 1.6 | 1.3 | 1.5 | 210 / 2.0 | 1.2 |
| 116 | Cr or Ti | Al, Au, Pt, Pd, Rh or Ag | BeO | SrO.6[Fe$_{1.80}$Co$_{0.1}$Ti$_{0.1}$O$_3$] | 1.6 | 1.4 | 1.7 | 380 / 1.5 | 1.2 |
| 117 | Cr or Ti | Al, Au, Pt, Pd, Rh or Ag | BeO | PbO.5[Fe$_{1.60}$Co$_{0.2}$Ti$_{0.2}$O$_3$] | 1.6 | 1.4 | 1.7 | 310 / 0.8 | 1.8 |
| 118 | Cr or Ti | Al, Au, Pt, Pd, Rh or Ag | BeO | Ba$_{0.5}$La$_{0.5}$O.6[Fe$_{1.92}$Co$_{0.08}$O$_3$] | 1.6 | 1.3 | 1.7 | 430 / 2.5 | 1.1 |
| 119 | Cr or Ti | Al, Au, Pt, Pd, Rh or Ag | BeO | Ba$_{0.25}$La$_{0.25}$O.6[Fe$_{1.96}$Co$_{0.04}$O$_3$] | 1.6 | 1.3 | 1.7 | 450 / 2.1 | 0.8 |
| 120 | Cr or Ti | Al, Au, Pt, Pd, Rh or Ag | BeO | LaO.6[Fe$_{1.83}$Co$_{0.17}$O$_3$] | 1.5 | 1.4 | 1.8 | 450 / 2.7 | 1.3 |

What is claimed is:

1. A magneto-optical recording medium comprising a substrate and a reflective layer, a dielectric undercoat layer and a hexagonal magnetoplumbite metal oxide magnetic layer laminated thereon in order, wherein the crystal misfit between said reflective layer and said dielectric undercoat layer formed thereon is within ±30% of the atomic surface distance of the reflective layer, and wherein the crystal misfit between said dielectric undercoat layer and said hexagonal magnetoplumbite metal oxide magnetic layer is within ±30% of the atomic surface distance of the dielectric undercoat layer.

2. The magneto-optical recording medium according to claim 1, wherein said crystal misfit between said reflective layer and said dielectric undercoat layer formed thereon is within ±15%.

3. The magneto-optical recording medium according to claim 1, wherein said crystal misfit between said dielectric undercoat layer and said hexagonal magnetoplumbite metal oxide magnetic layer formed thereon is within ±15%.

4. The magneto-optical recording medium according to claim 1, wherein said substrate is pregrooved.

5. The magneto-optical recording medium according to claim 1, wherein said reflective layer is made of any metal of Au, Pt, Rh, Pd, Ag and Al, and the (111) face of said metal is orientated in the direction parallel to said substrate.

6. The magneto-optical recording medium according to claim 1, wherein said reflective layer has the (111) face oriented by controlling the temperature of said substrate when said reflective layer is formed by a thin film forming method.

7. The magneto-optical recording medium according to claim 1, wherein said reflective layer has the (111) face orientated by the steps of forming said reflective layer by vapordeposition and thereafter annealing same.

8. The magneto-optical recording medium according to claim 1, wherein said reflective layer has a film thickness of 0.01–5 μm.

9. The magneto-optical recording medium according to claim 8, wherein said reflective layer has a film thickness of 0.05–2 μm.

10. The magneto-optical recording medium according to claim 1, where said dielectric undercoat layer is a layer selected from the group consisting of ZnO (002), AlN(002), MgO(111), BeO(002) and Ni-Zn ferrite (111), wherein said numbers (002) and (111) each refer to the crystal face which is oriented parallel to the substrate surface.

11. The magneto-optical recording medium according to claim 1, wherein said dielectric undercoat layer is epitaxially-grown on said reflective layer by sputtering, CVD or vapor deposition.

12. The magneto-optical recording medium according to claim 1, wherein said dielectric undercoat layer has a film thickness of 0.02–0.5 μm.

13. The magneto-optical undercoat layer according to claim 12, wherein said dielectric undercoat layer has a film thickness of 0.05–0.3 μm.

14. The magneto-optical recording layer according to claim 1, wherein said hexagonal magnetoplumbite metal oxide magnetic layer is represented by the following formula:

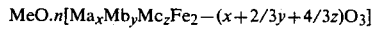

$$MeO \cdot n[Ma_xMb_yMc_zFe_{2-(x+2/3y+4/3z)}O_3]$$

wherein, Me, Ma, Mb, Mc, s, y, z and n are defined as follows:

Me represents one or more divalent metals selected from the group consisting of Ba, Sr, Pb, La and Ca,
Ma represents one or more trivalent metals selected from the group consisting of Ga, Al, Cr and Rh,
Mb represents one or more divalent metals selected from the group consisting of Co and Ni,
Mc represents one or more metals selected from the group consisting of Ti, Mn, Ir, Sn, V, Ta, Hf, Pd, Nb, Re, Pt, Os, Zr, Tc, Rh, Ge, Ru, W, Te, Pr, Ce and Pb, and wherein
$x$ has a value such that $0 \leq x \leq 0.5$,
$y$ has a value such that $0 < y \leq 5$,
$z$ has a value such that $0 \leq z \leq 0.5$, wherein x and z are not simuultaneously 0 and,
$0 < x+y+z \leq 1.0$, and wherein
$n$ has a value such that $5 \leq n \leq 6$.

15. The magneto-optical recording medium according to claim 14, wherein said hexagonal magnetoplumbite metal oxide magnetic layer is selected from the group consisting of:
$BaO \cdot 6 \, [Fe_{1.90}Co_{0.05}Ti_{0.05}O_3]$,
$BaO \cdot 6 \, [Fe_{1.50}Co_{0.25}Ti_{0.25}O_3]$,
$BaO \cdot 6 \, [Fe_{1.70}Co_{0.15}Ti_{0.15}O_3]$,
$BaO \cdot 5 \, [Fe_{1.90}Co_{0.05}Ti_{0.05}O_3]$,
$BaO \cdot 5 \, [Fe_{1.70}Co_{0.15}Ti_{0.15}O_3]$,
$BaO \cdot 6 \, [Fe_{1.70}Co_{0.05}Ti_{0.05}Al_{0.2}O_3]$,
$BaO \cdot 6 \, [Fe_{1.65}Co_{0.1}Ti_{0.1}Ga_{0.15}O_3]$,
$SrO \cdot 6 \, [Fe_{1.80}Co_{0.1}Ti_{0.1}O_3]$,
$PbO \cdot 5 \, [Fe_{1.60}Co_{0.2}Ti_{0.2}O_3]$,
$Ba_{0.5}La_{0.5}O \cdot 6[Fe_{1.92}Co_{0.08}O_3]$,
$Ba_{0.25}La_{0.25}A \cdot 6[Fe_{1.96}Co_{0.04}O_3]$, and
$LaO \cdot 6[Fe_{1.83}Co_{0.17}O_3]$.

16. The magneto-optical recording medium according to claim 1, wherein said magnetic layer is formed on said dielectric undercoat layer by vacuum vapor-deposition, sputtering, or ion plating with the condition that said substrate is held at a temperature of 400°–700° C. during the formation of said dielectric undercoat layer.

17. The magneto-optical recording medium according to claim 1, wherein said magnetic layer is subjected to heat treatment at 500°–800° C.

18. The magneto-optical recording medium according to claim 1, wherein said magnetic layer has a film thickness of 0.1–10 μm.

19. The magneto-optical recording medium according to claim 1, wherein an intermediate layer is provided between said substrate and said reflective layer in order to improve the crystallographic orientation of the reflection layer.

20. The magneto-optical recording medium according to claim 19, wherein said intermediate layer comprises Ti or Cr.

21. The magneto-optical recording medium according to claim 19, wherein said intermediate layer has a film thickness of 0.001–0.5 μm.

22. The magneto-optical recording medium according to claim 21, wherein said intermediate layer has a film thickness of 0.02–0.3 μm.

23. The magneto-optical recording medium according to claim 1, wherein said magnetic layer is provided thereon with a protective plate.

24. The magneto-optical recording medium according to claim 15, wherein said reflective layer is selected from the group consisting of Al(111), Au(111), Pt(111), Pd(111), Rh(111) and Ag(111), and said dielectric undercoat layer is ZnO(002), and wherein said numbers (002) and (111) each refer to the crystal face which is oriented parallel to the substrate surface.

25. The magneto-optical recording layer is selected from the group consisting of Al(111), Au(111), Pt(111), Pd(111), Rh(111) and Ag(111), and said dielectric undercoat layer is AlN (002), and wherein said numbers (002) and (111) each refer to the crystal face which is oriented parallel to the substrate surface.

26. The magneto-optical recording medium according to claim 15, wherein said reflective layer is selected from the group consisting of Al(111), Au(111), Pt(111), Pd(111), Rh(111) and Ag(111), and said dielectric undercoat layer is MgO(111), and wherein said number (111) refers to the crystal face which is oriented parallel to the substrate surface.

27. The magneto-optical recording medium according to claim 15, wherein said reflective layer is selected from the group consisting of Al(111), Au(111), Pt(111), Pd(111), Rh(111) and Ag(111), and said dielectric undercoat layer is Ni-Zn ferrite, and wherein said number (111) refers to the crystal face which is oriented parallel to the substrate surface.

28. The magneto-optical recording medium according to claim 15, wherein said reflective layer is selected from the group consisting of Al(111), Au(111), Pt(111), Pd(111), Rh(111) and Ag(111), and said dielectric undercoat layer is BeO(002), and wherein said numbers (002) and (111) each refer to the crystal face which is oriented parallel to the substrate surface.

29. The magneto-optical recording medium according to claim 24, which further comprises an intermediate layer of Cr or Ti between said substrate and said reflective layer.

30. The magneto-optical recording medium according to claim 25, which further comprises an intermediate layer of Cr or Ti between said substrate and said reflective layer.

31. The magneto-optical recording medium according to claim 26, which further comprises an intermediate layer of Cr of Ti between said substrate and said reflective layer.

32. The magneto-optical recording medium according to claim 27, which further comprises an intermediate layer of Cr or Ti between said substrate and said reflective layer.

33. The magneto-optical recording medium according to claim 28, which further comprises an intermediate layer of Cr or Ti between said substrate and said reflective layer.

34. The magneto-optical recording medium according to claim 17, wherein, in addition to said heat treatment, said magnetic layer is also subjected to a magnetic field after formation.

35. The magneto-optical recording medium according to claim 6, wherein said thin-film forming method is electron beam vapor deposition.

36. A magneto-optical recording medium comprising a substrate and a reflective layer, a dielectric undercoat layer and a hexagonal magnetoplumbite metal oxide magnetic layer laminated thereon in order, and having a crystal misfit between said reflective layer and said dielectric undercoat layer and between said dielectric undercoat layer and said metal oxide magnetic layer, and wherein said crystal misfit between said reflective layer and said dielectric undercoat layer is within ±30% of the atomic surface distance of the reflective layer, and wherein said crystal misfit between said dielectric undercoat layer and said metal oxide metal layer is within ±30% of the atomic surface distance of the dielectric undercoat layer, and wherein said reflective layer is made of a metal selected from the group consisting of Au, Pt, Rh, Pd, Ag and Al, and wherein the (111) face of said metal is oriented in a direction parallel to said substrate surface.

37. The magneto-optical recording medium according to claim 36, wherein said dielectric undercoat layer is a layer selected from the group consisting of ZnO(002), AlN(002), MgO(111), BeO(002) and Ni-Zn ferrite (111), wherein said numbers (002) and (111) each refer to the crystal face which is oriented parallel to the substrate surface.

* * * * *